United States Patent [19]

Takata et al.

[11] Patent Number: 4,913,307
[45] Date of Patent: Apr. 3, 1990

[54] EASILY OPENABLE PACKAGING CONTAINER AND METHOD FOR PRODUCING THE SAME

[75] Inventors: Yukio Takata; Takeshi Shinohara, both of Himeji, Japan

[73] Assignee: Idemitsu Petrochemical Co., Ltd., Tokyo, Japan

[21] Appl. No.: 250,063

[22] Filed: Sep. 28, 1988

Related U.S. Application Data

[63] Continuation-in-part of Ser. No. 102,648, Sep. 30, 1987, Pat. No. 4,801,041.

[30] Foreign Application Priority Data

| Sep. 30, 1986 | [JP] | Japan | 61-229594 |
| Feb. 27, 1987 | [JP] | Japan | 62-42794 |
| Sep. 29, 1987 | [JP] | Japan | 62-242717 |

[51] Int. Cl.$^4$ .............................................. B65D 41/32
[52] U.S. Cl. ..................................... 220/276; 220/359
[58] Field of Search ....................... 220/270, 276, 359; 156/69

[56] References Cited

U.S. PATENT DOCUMENTS 4,589,568  5/1986  Ito et al. ............................... 220/359

Primary Examiner—Donald F. Norton
Attorney, Agent, or Firm—Antonelli, Terry & Wands

[57] ABSTRACT

An easily openable packaging container produced by heat-sealing a container member with a lid member, the easily openable packaging container comprising:

(a) a container member including a recess portion and an integral flange portion surrounding the recess portion; and (b) a multilayer lid member including an inner layer and a substrate layer adjacent to the inner layer being peelable from the inner layer, the inner layer being heat-sealed to the flange portion outside the inner edge of the flange portion and inside the outer edge of the flange portion and having a first circular depression therein outside the outer edge of the heat-sealed portion and inside the outer edge of the flange portion and a second circular depression therein inside the inner edge of the heat-sealed portion and outside the inner edge of the flange portion, the first circular depression and the second circular depression being formed by pressing pressure, the first and second circular depression being for cutting the inner layer when separating the multilayer lid member from the container member, thereby leaving a part of the inner layer between the first and second depressions bonded to the flange portion.

9 Claims, 4 Drawing Sheets

Fig. 9

EASILY OPENABLE PACKAGING CONTAINER AND METHOD FOR PRODUCING THE SAME

RELATED APPLICATIONS

This a continuation-in-part of copending application Ser. No. 102,648, filed Sep. 30, 1987 now U.S. Pat. No. 4,801,041.

BACKGROUND OF THE INVENTION (1) Field of the Invention

The present invention relates to an easily openable packaging container and method of producing the same. Particularly, the present invention relates to an easily openable packaging container which, due to its ability of being strongly heat-sealed, has excellent sealing property, and as well has excellent easy openability, and to the method of producing the container. The easily openable packaging container may be suitably used for packaging foods or liquids, particularly for heat sterilization packaging.

(2) Description of the Related Art

To ensure hermetical packaging of foods or liquids, containers has been heat-sealed with a lid member after a content has been filled therein. However, the conventional heat-sealed packaging containers thus produced have a defect that if heat-seal strength is increased to improve their seal property, openability will be aggravated causing the necessity for cutting instruments to gain access to the content. On the other hand, when the openability is improved by choosing materials of containers and lid members which can provide a proper heat-seal strength, the seal properties of the obtained containers broadly varies depending upon the heat-seal conditions, such as temperature, pressure, and time, or owing to foreign matters such as the content sandwiched between the heat-seal surfaces, and uniform heat-seal strength therefore cannot be obtained, resulting in a decrease of the seal property. In the latter case, the packaging containers thus produced are inapplicable to packages in which the internal pressure increases at the time of heat sterilization such as boiling or retort treatment. That is, the conventional hermetically sealed containers, which is to be opened by peeling the lid member between their heat-seal surfaces, could not reconcile the antipodal objects, secure seal and easy openability, simultaneously.

In Japanese Utility Model Application Laid-open No. 148,742/1988 is disclosed a method for solving these problems by providing a circular notch to the under-lid of a multilayer lid to cut the under-lid at the time of peeling the lid, for the facility of peeling. The method, however, provides seal property by spacing out the notch and the outer edge of the under-lid, and after opening the containers, a part of the under-lid outside the notch remains protruding inside the opening. That is, the resulting aperture is a partial hole, and it is impossible to open the whole of the opening portion of the containers unlike the other conventional containers. The containers therefore encountered a problem that they are inapplicable to drinks or desserts to be drunk or eaten directly from the opened containers since the contents cannot be discharged readily.

In Japanese Pat. Applciation Laid-open No. 190,461/1986 is disclosed a method of attaining easy openability by choosing a resin material having a proper internal cohesive failure of the resin. The method however has problems that the seal layer resins are limited and the peeled surfaces of the containers are rough.

In Japanese Pat. Application Laid-open No. 193,848/1986 is disclosed a method of attaining easy openability by choosing a particular combination of resin materials for heat-sealing, i.e. a multilayer material including a blend layer of ethylene-vinyl acetate copolymer and ionomer and an ionomer layer. The method however has problems that since opening is conducted by tearing, the combination of resin materials is , limited to the above combination, aned the separation between the opened surface and the remaining surface cannot be made beautifully resulting in the unpleasantness of the opened surface in appearance.

In Japanese Pat. Application Laid-open No. 143,388/79 is disclosed a method of attaining easy openability by providing a resin print layer to at least one of the resin materials to be heat-sealed together to facilitate the peeling of the resin materials, and in Japanese Pat. Application Laid-open No. 203,372/1986 is disclosed a method of attaining easy openability by providing a releasing print layer to at least one of the resin materials which are to be heat-sealed together. However, neither of the methods is prevalent owing to its comprehensive process which necessarily includes printing process and adjustment of the print portion to the seal portion.

Figure 8:
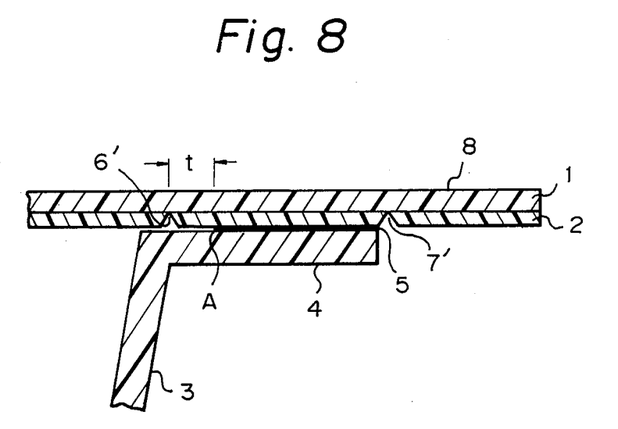
FIG. 8 is a partially sectional view of a container shown to compare with the easily openable packaging container of the present invention.
Figure 9:
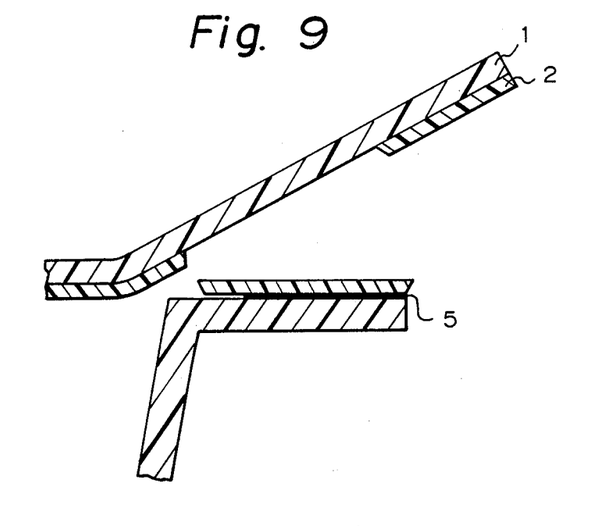
FIG. 9 is a partially sectional view illustrating the container of FIG. 8 being opened.

Referring to FIG. 8 and FIG. 9, which show an easily openable container having excellent seal property and openability, a container body 3 is heat-sealed with a multilayer lid member of which the inner layer is provided with notches 6' and 7' is heat-sealed to the flange portion 4 of the container body, and the delamination of the multilayer lid member is utilized when opening the container. The container however has some problems in the manufacture thereof. Firstly, the manufacture procedure of the container necessarily includes a step of providing a notch in lid member thereof, and further, owing to the thinness of the lid member, it is difficult to form the notch. Secondly, at the time of heat-sealing, the adjustment of the positions of the notch portion and the sealing portion is difficult.

SUMMARY OF THE INVENTION

One of the object of the present invention is to utilize the delamination of a multilayer lid member heat-sealed and thereby provide an easily openable packaging container excelling not only in sealing property but also in openability.

A further object of the present invention is to provide an easily openable packaging container which may have a peeled surface of a good appearance after opening and is tolerable to boiling or retort treatment.

Another object of the present invention is to provide a method of producing an easily openable packaging container in low cost by employing general sealing techniques without requiring complicated steps.

Another object of the present invention is to provide an easily openable packaging container in which the sealing width may be optionally determined regardless of the shape of the flange portion, such as a flat flange or a flange having an integral rib or curl.

That is, according to the present invention, there is provided an easily openable packaging container produced by heat-sealing a container member with a lid member, the easily openable packaging container comprising:

(a) a container member including a recess portion and an integral flange portion surrounding the recess portion; and (b) a multilayer lid member including an inner layer and a substrate layer adjacent to the inner layer being peelable from the inner layer, the inner layer being heat-sealed to the flange portion outside the inner edge of the flange portion and inside the outer edge of the flange portion and having a first circular depression therein outside the outer edge of the heat-sealed portion and inside the outer edge of the flange portion and a second circular depression therein inside the inner edge of the heat-sealed portion and outside the inner edge of the flange portion, the first circular depression and the second circular depression being formed by pressing pressure and being for cutting the inner layer when separating the multilayer lid member from the container member, thereby leaving a part of the inner layer between the first and second depressions bonded to the flange portion.

Such an easily openable packaging container, for example, may be produced by heat-sealing a multilayer lid member to a container member, the multilayer lid member including an inner layer and a substrate layer adjacent to the inner layer being peelable from the inner layer, the inner layer being a thermoplastic resin layer having a melting point or softening point lower than those of the material of the substrate layer, the container member including a recess portion and an integral flange portion surrounding the recess portion, comprising heating and pressing simultaneously the multilayer lid member to heat-seal the inner layer to the upper face of the flange portion by downwardly pressing a heat-seal ring, the heat-seal ring having a heat-sealing face above and within the flange portion, the heat-sealing face having, at the outer edge thereof, a first circular projection portion projecting downwardly from the heat-sealing plane and, at the inner edge thereof, a second circular projection portion projecting downwardly from the heat-sealing plane, whereby upon downwardly pressing the heat-seal ring, a first circular depression outside the outer edge of the heat-sealed portion and inside the outer edge of the flange portion and a second circular depression inside the inner edge of the heat-sealed portion and outside the inner edge of the flange portion are formed in the inner layer of the multilayer lid member.

DESCRIPTION OF THE PREFERRED EMBODIMENTS

Figure 1:
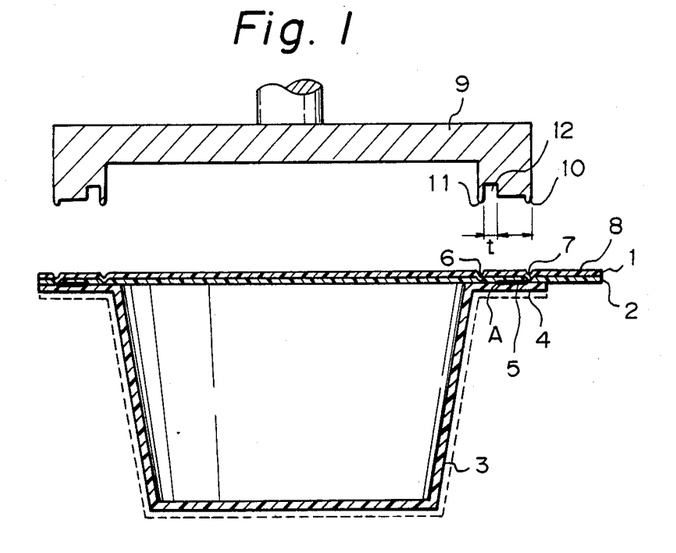
FIG. 1 is a sectional view of the easily openable packaging container of one embodiment of the present invention illustrating the easily openable packaging container being heat-sealed by the method of one embodiment of the present invention.
Figure 2:
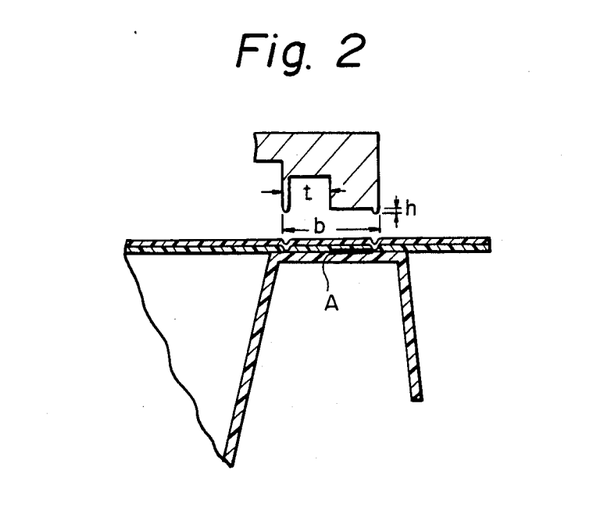
FIG. 2 is a partially sectional view of the easily openable packaging container of one embodiment illustrating the easily openable packaging container being heat-sealed by the method of shown in FIG. 1.

FIG. 1 and FIG 2 are sectional views illustrating the easily openable packaging container of the preferred embodiment of the present invention being heat-sealed by the method of the preferred embodiment of the present invention.

Referring to FIG. 1, the referential numeral 2 represents the inner layer of the multilayer lid member of the present invention, the referential numeral 1 represents the substrate layer, and the referential numeral 8 represents a tab. A container member 3 includes a recess portion and an integral flange portion 4. After filling an article, the container member 3 is covered with the lid member and then tightly heat-sealed with the inner layer 2 of the lid member at the flange portion 4. The referential numeral 5 represents the heat-sealed portion. A first circular depression 7 and a second circular depression 6 are formed in the inner layer 2 of the multilayer lid member at the outer edge of the heat-sealed portion 5 and at the inside of the inner edge of the heat-sealed portion 5, respectivley. By pressing downwardly a heat-seal ring 9, the multilayer lid member and the flange portion 4 of the container member 3 are heat-sealed together, and the circular depressions 6 and 7 are formed simultaneously. The first depression 7 at the outer edge of the heat-sealed portion 5 permits the inner layer 2 and the substrate layer 1 to start in delaminating between them. Upon lifting the tab 8, the multilayer lid member delaminates between the substrate layer 1 and the inner layer 2 from the first circular depression 7 to the second circular depression 6. The second depression 6 inside the inner edge of the heat-sealed portion terminates the delamination of the multilayer lid member. After the multilayer lid member progressively delaminated to the second circular depression 6, the delamination stops at the depression 6 and thus the multilayer lid member inside the heat-sealed portion is opened.

To obtain good openability, it is preferable that the lowest end of each circular depression reaches the flange face of the container member 3. The circular depressions may be provided completely around the peripheries of both edges of the heat-sealed portion in a shape of complete circle, traingle, rectangular, etc., or a part of the peripheries may be left without the circular depressions. In case where the multilayer lid member is to be torn with a part remaining not separated, the part should be left not provided with the circular depressions.

As shown in FIG. 1, the heat-seal ring 9 employed for providing the circular depressions has, at the inner edge and outer edge thereof, projections 10 and 11 projecting downwardly from the heat-sealing plane. The preferred heat-seal ring to be used in the present invention includes a non-pressing portion 12 having a width of t between the second circular depression 6 and the heat-seal portion of the heat-seal ring. When such a heat-seal ring is used to heat-seal a multilayer lid member to the flange portion of a container, the packaging container thus produced is ensured to have an unheat-sealed portion having a uniform width of t between the first circular depression 6 and the inner edge of the heat-sealed portion 5. In this case, upon tearing the multilayer lid member from inside the packaging container, the stress concentrates to the point A in FIG. 1, making the delamination from the second circular depression 6 difficult. Thus the peeling strength from the inside becomes larger than that from the outside, resulting in a higher pressure resistance and increased sealing property. The width of t is usually 1 to 10 mm, preferably 2 to 10 mm.

The width of the heat-seal ring 9 is not particularly limited and is generally 1 to 10 mm. The height h of the circular projections 10 and 11 each being provided at both peripheries of the heat-seal ring 9 is not particularly limited and may be determined considering the materials of the multilayer lid member, etc. The height h is generally 10 to 500 $\mu$ m, preferably 20 to 300 $\mu$ m.

Referring to FIG. 2, the container member of the easily openable packaging container includes a rib integrally adjoining the flange portion.

Figure 3:
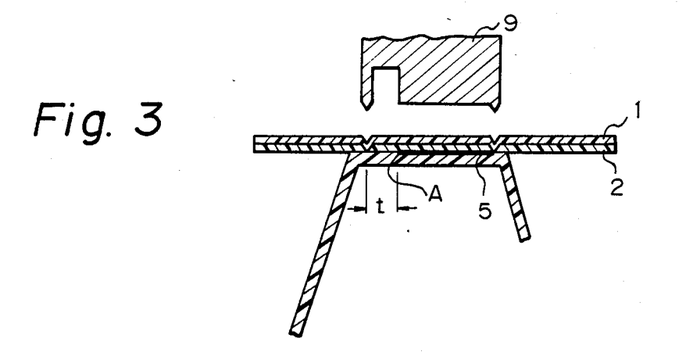
FIG. 3 is a partially sectional view of the easily openable packaging container of one embodiment of the present invention illustrating the easily openable packaging container being heat-sealed by the method of one embodiment of the present invention.

Referring to FIG. 3, the inner layer 2 is provided with V-shaped first and second circular depressions by the use of a heat-seal ring having two V-shaped projections.

Figure 4:
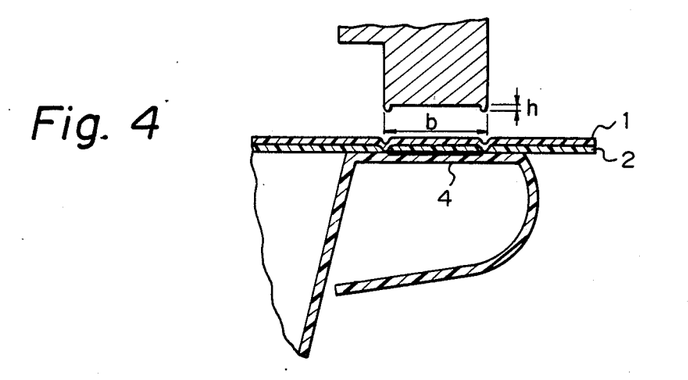
FIG. 4 is a partially sectional view of the easily openable packaging conatiner of one embodiment illustrating the easily openable packaging container being heat-sealed by the method of one embodiment.
Figure 5:
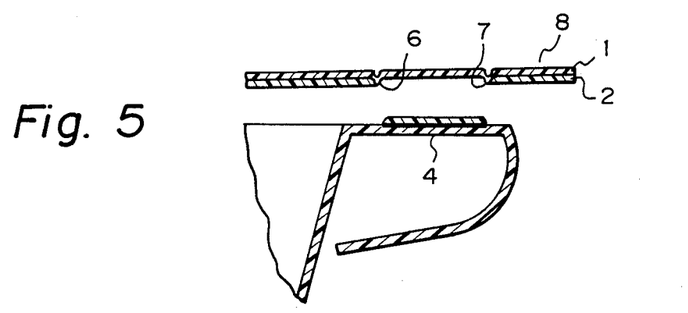
FIG. 5 is a partially sectional view illustrating the easily openable packaging container of FIG. 4 after opening.

Referring to FIG. 4 and FIG. 5 which are partially sectional views showing the easily openable packaging container and the method of producing the container of further embodiment of the present invention, the container member includes a curl portion integrally adjoining the flange portion, and the heat-seal ring used for producing the container has no non-pressing portion. FIG. 5 shows the easily openable packaging container shown in FIG. 4 after opening.

Figure 6:
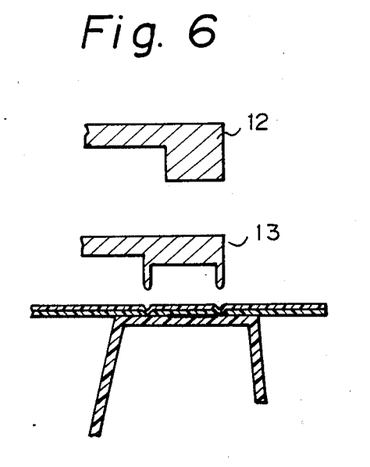
FIG. 6 is a partially sectional view illustrating a lid member and a container member being heat-sealed by the method of one embodiment of the present invention.

FIG. 6 is a partially sectional view illustrating a multilayer lid member being heat-sealed by the method of another embodiment of the present invention. While in the method illustrated in FIG. 1, heat-seal and formation of circular projections are operated simultaneously, in the method shown in FIG. 6, the container member and the multilayer lid member have been previously heat-sealed together by the use of a heat-seal ring 12 having no circular projection, and thereafter the circular depressions are formed in the inner layer of the multilayer lid member by the use of a heat-seal ring 13 having a second circular projection and a first circular projection at the inner edge and outer edge thereof respectively. Since the method conducts heat-seal and formation of circular depressions separately, each of heat-seal and formation of circular depressions can be performed under the optimum conditions repsectively.

The easily openable packaging container of the present invention can be easily opened even if a curl or rib were provided.

The shape of the container member is not particularly limited and it is generally circle or rectangular, etc. Along the flange portion of the container member having such a shape, multilayer lid member is circularly heat-sealed.

The multilayer lid member to be used in the present invention comprises an inner layer to be heat-sealed to the container member and a substrate layer adjacent to the inner layer. The material of the inner layer is a thermoplastic resin having a melting point or softening point lower than those of the material of the substrate layer. Some illustrative examples of the materials of the substrate layer include a single layer film made of a plastic such as polypropylene, polyolefin resins containing 20 to 80% by weight of inorganic fillers, polycarbonate resins, polyester resins, ethylene-vinylalcohol copolymer, polyvinylidenechloride resin, and polyamide resins; a multilayer film made of two or more of these plastics; paper; aluminum foil; iron sheet; and a composite material thereof. The thermoplastic resin of the inner layer is a resin capable of being easily heat-sealed with the inner surface layer of the container member, and some illustrative examples include polyethylene such as low density polyethylene and high density polyethylene; polypropylene; ethylene-$\alpha$-olefin copolymer having a density of 0.86 to 0.95; ethylene-unsaturated carboxylic acid copolymers such as ethylene-vinyl acetate copolymer, ethylene-ethyl acrylate copolymer, ethylene-maleic anhydride copolymer, and metal salts of ethylene-acrylic acid copolymer such as zinc salt, sodium salt, and calcium salt (ionomer resins).

The peeling strength between the inner layer and the substrate layer of the multilayer lid member is not particularly limited with the proviso the multilayer lid member can be peeled between the two layers when the multilayer lid member is opened, and it is generally about 200 to 1,500 g/15 mm (tensile speed: 300 mm/min), preferably about 300 to 1,200 g/15 mm). The thickness of the inner layer of the multilayer lid member is generally 10 to 100 $\mu$ m, preferably 15 to 70 $\mu$m.

The inner layer of the multilayer lid member may also be a multilayer sheet comprising a first resin layer for heat-sealing with the container member and a second resin layer for peeling, the second layer being sandwiched between the layer for heat-sealing and the substrate layer and able to be peeled from the substrate layer.

Further, the inner layer and the substrate layer of the multilayer lid member may be adhered by a pressure sensitive adhesive layer to control the peeling strength between the inner layer and the substrate layer. The packaging container produced using such a multilayer lid member can be resealed repeatedly after opening the multilayer lid member. The illustrative example of the pressure sensitive adhesive which may be used in the present invention is a resin, such as natural rubbers, styrene-butadiene rubber, neoprene rubber, butyl rubber, polyisobutylene, polyacrylates, polyvinylacetate, and polyvinylethers, blended with a tackifier, such as coumarone resin, terpene resin, petroleum hydrocarbon resins (synthetic polyterpene resin, aromatic hydrocarbon resins, alicyclic hydrocarbon resins, unsaturated hydrocarbon resins, polybutene resin, liquid rubbers, etc.), and rosin resins, and further, at need, with other additives such as placticizers.

Figure 7:
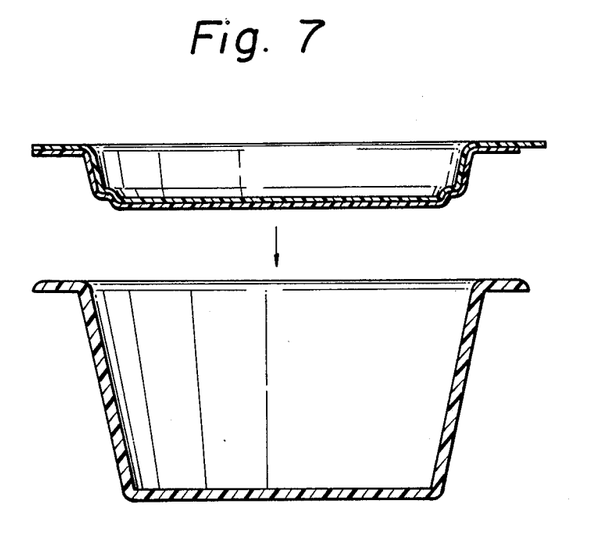
FIG. 7 is a sectional view of a lid member and a container to be used for the production of the easily openable packaging container of one embodiment of the present invention in which the lid member is a concave lid.

Though the multilayer lid member may be of a flat film form, it may also be formed into a concave lid as shown in FIG. 7. The shape of the concave lid is not to be particularly limited with the proviso that the concave portion drops and be fixed into the opening of the container member to expel the air remaining in the container member after filling a content, and for example, it may be a bowl shape or have a flat bottom. The concave lid may be formed by thermoforming such as vacuum forming and pressure forming, press forming, and the lie. According to the present invention, easy openability will be ensured even if the heat-seal temperature and pressure is increased to increase the heat-seal strength. Therefore, even if the content flows over at the time of setting such a concave lid into the container member and pollutes the heat-seal area, high sealing property will be obtained by increasing the heat-seal temperature and pressure.

The material of the container member to be used in the present invention is not particularly limited, and the illustrative examples of the material of the container member include polyolefin resins such as polyethylene and polypropylene; polystyrene resins; polyamide resins; polyester resins; polycarbonate resins; ethylene-vinylalcohol copolymer; polyvinylidenechloride resin; polyacrylonitrile; mixtures thereof; resin compositions wherein these resins are mixed with 5 to 70% by weight of a thermoplastic elastomer, various additives or an inorganic filler; metals; and papers.

To increase the gas barrier property or to reduce the danger of deformation of the product packaging container, a multilayer material of two or more layers in which the above-mentioned material is further laminated with other layer materials may be used for the container member of the present invention. Some examples of the other material layer include ones having excellent gas barrier property, for example, resin layers such as ethylene-vinylalcohol copolymer, polyvinylidenechloride, nylon, and polyethyleneterephthalate, a vapour-deposited metal layer, and aluminum foil. Also, composite materials thereof with paper or the like may be used. These layers made of other materials may be of either a single layer, a multilayer consisting of two or more layers or a resin layer containing 10 to 80 % by weight of an inorganic filler.

The container member made of resins may be formed from a plastic sheet, a coextruded multilayer sheet or a laminate sheet each made form the above-described resins, by, for example, vacuum forming or pressure forming the sheet, or may be formed from the above-described resins by, for example, injection molding, injection blow molding or blow molding the resins. Further, it may also be produced by thermoforming a multilayer film on the inner surface of a container made of a paper or the like.

For the laminate processing, for example, extrusion laminate technique, hot melt laminate technique, dry laminate technique, and wet laminate technique may be employed.

Composite container members consisting of a resin layer and a paper or metal layer may be produced by, for example, adhering or winding a paper of metal to or on a resin container.

Opening of the easily openable packaging container of the present invention which has been filled with an article and heat-sealed with a mulitlayer lid member can be easily effected by the following operation.

For example, referring to FIG. 5, upon lifting the tab 8, the delamination of the multilayer lid member initially begins from the first circular depression 7 between the inner layer 2 and the substrate layer 1, and the delamination between the inner layer 2 and the substrate layer progresses above the heat-sealed portion to the second circular depression 6, whereby a part of the inner layer 2 is separated from the multilayer lid member remaining bonded to the flange portion. The multilayer lid member is then removed completely by pulling the tab 8 progressively. Accordingly, even if the multilayer lid member and the container member are hermetically heat-sealed together to attain good sealing property, opening will be easily effected. Also, since the method of the present invention permits free establishment of heat-seal conditions such as the width of heat-seal, aberration in heat-sealing occurred for some reasons will not deteriorate the easily openability.

Since, as described above, the delamination can be effected even if the peeling strength of heat-sealing is increased, the easily openable packaging container of the present invention can be made into an excellent container which is tolerable to boil or retort treating. Further, the method of the present invention has an extremely wide range of utilization and application since it can be applied for any shape or material of containers by merely changing the heat-seal ring alone.

The following examples are presented to describe the present invention in more details, and the present invention is by no means limited by these examples.

EXAMPLES 1 AND 2

EXAMPLE 1

A high density polyethylene sheet of 800 $\mu$ m in thickness was formed by vacuum and pressure forming into a flanged container member of 80 mm$\phi \times$40 mm (height) in size having a rib integrally adjoining the flange portion.

A multilayer sheet consisting of ethylene-vinyl acetate copolymer (inner layer)/polypropylene (substrate layer) (inner layer/substrate layer: 25 $\mu$ m/200$\mu$m) was thermoformed into a concave lid member having a shape shown in FIG. 7.

After covering the container member with the concave lid member, both are heat-sealed together by the use of a heat-seal ring as shown in FIG. 4 of b=4 mm and h=50$\mu$ m, at a temperature of 170° C. and a pressure of 2 kg/cm$^2$, for 2 seconds. The thickness of the inner layer of the concave lid at the circular depressions formed by the heat-sealing was substantially zero.

When the heat-sealed container thus produced was opened, the multilayer lid member was delaminated, thereby opening was easily effected.

EXAMPLE 2

A container member produced by the method of Example 1 was covered with a multilayer lid member of a film forming consisting of ionomer (inner layer)-/polyethyleneterephathalate (substrate layer) two layers (inner layer/substrate layer: 20$\mu$ m/100$\mu$ m) and then both are heat-sealed together by the use of a heat-seal ring as shown in FIG. 2 of b=6 mm, t=2 mm, and h=4$\mu$ m, at a temperature of 170° C. and a pressure of 2 kg/cm$^2$, for 2 seconds. The thickness of the inner layer of the concave lid at the circular depressions formed by the heat-sealing was substantially zero.

When an internal pressure was applied to the heat-sealed container thus produced, the multilayer lid member swelled starting from the point A, but the heat-sealed surfaces were not separated.

When the heat-sealed container thus produced was opened, the multilayer lid member was delaminated, thereby opening was easily effected.

What is claimed is:

1. An easily openable packaging container produced by heat-sealing a container member with a lid member, the easily openable packaging container comprising:
    (a) a container member including a recess portion and an integral flange portion surrounding the recess portion; and
    (b) a multilayer lid member including an inner layer and a substrate layer adjacent to the inner layer, said substrate layer being peelable from the inner layer, the inner layer being a thermoplastic resin layer having a melting point or softening point lower than that of the material of the substrate layer, the inner layer being heat-sealed to the flange portion outside an inner edge of the flange portion and inside an outer edge of the flange portion, said inner layer having a first circular depression therein outside an outer edge of the heat-sealed portion and inside the outer edge of the flange portion and a second circular depression therein inside an inner edge of the heat-sealed portion and outside the inner edge of the flange portion, the first circular depression and the second circular depression being formed by pressing pressure, the first and second circular depressions being for cutting the inner layer when separating the multilayer lid member from the container member, thereby leaving a part of the inner layer between the first and second depressions bonded to the flange portion.

2. The easily openable packaging container as defined in claim 1, wherein the second circular depression is spaced inwardly from the inner edge of the heat-sealed portion by an unheat-sealed portion.

3. A method of producing an easily openable packaging container by heat-sealing a multiplayer lid member to a container member, the multilayer lid member including an inner layer and a substrate layer adjacent to the inner layer being peelable from the inner layer, the inner layer being a thermoplastic resin layer having a melting point or softening point lower than those of the material of the substrate layer, the container member including a recess portion and an integral flange portion surrounding the recess portion, comprising heating and pressing simultaneously the multilayer lid member to heat-seal the inner layer to the upper face of the flange portion by downwardly pressing a heat-seal ring, the heat-seal ring having a heat-sealing face above and within the flange protion, the heat-sealing face having, at the outer edge thereof, a first ciruclar projection projecting downwardly from the heat-sealing plane and, at the inner edge thereof, a second circular projection projecting downwardly from the heat-sealing plane, whereby upon downwardly pressing the heat-seal ring, a first circular depression outside the outer edge of the heat-sealed portion and inside the outer edge of the flange portion and a second circular depression inside the inner edge fot he heat-sealed portion and outside the inner edge orf the flange portion are formed in the inner layer of the multilayer lid member.

4. The method as defined in claim 3, wherein the heat-seal ring has a non-pressing portion recessed from the heat-sealing plane and surrounding the second circular projection.

5. A method of producing an easily openable packaging container by heat-sealing a multilayer lid member to a container member, the multilayer lid member including an inner layer and a substrate layer adjacent to the inner layer being peelable from the inner layer, the inner layer being a thermoplastic resin layer having a melting point or softening point lower than those of the material of the substrate layer, the container member including a recess portion and an integral flange portion surrounding the recess portion, comprising:
    (a) heat-sealing the inner layer of the multilayer lid member to the upper face of the flange portion by downwardly pressing a first heat-seal ring to the multilayer lid member, the first heat-seal ring having a heat-sealing face above and within the flange portion, and
    (b) forming a first circular depression in the inner layer of the multilayer lid member outside the outer edge of the heat-sealed portion and a second circular depression inside the inner edge of the heat-sealed portion by downwardly pressing a second heat-seal ring to the multilayer lid member heat-sealed to the flange portion, the second heat-seal ring having a first circular projection at the outer edge thereof, a second circular projection at the inner edge thereof, and a non-pressing portion recessed from the first and second circular projections, the first and second circular projections being for forming the first and second circular depressions by the downward pressing of the heat-seal ring.

6. The method ad define in claim 5, wherein the second circular depression formed by the second circular projection of the second heat-seal ring is spaced inwardly from the inner edge of the heat-sealed portion.

7. An easily openable packaging container having a container member heat-sealed to alid member, the easily openable packaging container comprising a container member having a recess portion and an integral flange portion surrounding the recess portion and a multilayer lid member having an inner layer and a substrate layer peelable from the inner layer, the inner layer being a thermoplastic resin layer and having a melting point or a softening point lower than that of the material of the substrate layer, a portion of the inner layer being heat-sealed to the flange portion, said heat-sealed portion being located outside an inner edge of the flange portion and inside an outer edge of the flange portion; said inner layer and said substrate having a first circular depression therein positioned outside an outer edge of the heat-sealed portion and inside the outer edge of the flange portion and a second circular depression therein positioned inside the inner edge of the heat-sealed portion and outside the inner edge of the flange portion; the first and second circular depressions being for cutting the inner layer when separating the multilayer lid member from the container member thereby leaving a part of the inner layer overlying the heat-sealed portion between the first and second depressions bonded to the flange portion.

8. A method of producing an easily openable packaging container by heat-sealing a multilayer lid member to a container member, the multilayer lid member having an inner layer and a substrate layer peelable form the inner layer, the inner layer being a thermoplastic resin layer having a melting point or softening point lower than that of the material of the substrate layer, and the container member having a recessed portion and an intergral flange portion surrounding the recess portion, which comprises downwardly pressing a planar surface on a portion of the multilayer lid member overlying the flange portion and applying heat to said portion to form a heat-sealed portion between the inner layer and an upper face of the flange portion, and downwardly pressing first and second circular projections projecting downwardly onto the multilayer lid member, the first circular projection contacting the multilayer lid member outside of the heat-sealed portion and inside the outer edge of the flange portion and the second circular projection contacting the multilayer lid member inside an inner edge of the heat-sealed portion and outside the inner edge of the flange portion to thereby form first and second circular depressions in the substrate and the inner layer of the multilayer lid member.

9. The method as defined in claim 8, wherein the planar surface and the first and second circular projections are formed in a single ring member and are simultaneously pressed downwardly to form the heat-sealed portion and the first and second circular depressions.

* * * * *